US008184417B2

(12) United States Patent
Pietrzyk et al.

(10) Patent No.: US 8,184,417 B2
(45) Date of Patent: May 22, 2012

(54) APPARATUS FOR FAULT TOLERANT ANALOG INPUTS

(75) Inventors: Arthur P. Pietrzyk, Thompson, OH (US); Peter M. Delic, Willoughby, OH (US); William E. Waltz, Mentor, OH (US); Russell W. Brandes, Brunswick, OH (US); Dennis G. Schneider, New Berlin, WI (US); Louis L. Smet, Wauwatosa, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 364 days.

(21) Appl. No.: 12/540,493

(22) Filed: Aug. 13, 2009

(65) Prior Publication Data

US 2010/0125345 A1 May 20, 2010

Related U.S. Application Data

(60) Provisional application No. 61/115,795, filed on Nov. 18, 2008, provisional application No. 61/115,801, filed on Nov. 18, 2008, provisional application No. 61/115,807, filed on Nov. 18, 2008.

(51) Int. Cl.
*H02H 3/00* (2006.01)
*G05B 11/01* (2006.01)

(52) U.S. Cl. ................ 361/88; 361/78; 700/12; 700/21; 700/22

(58) Field of Classification Search .................... 361/88, 361/78

See application file for complete search history.

(56) References Cited

U.S. PATENT DOCUMENTS

| | | | | |
|---|---|---|---|---|
| 4,862,400 | A * | 8/1989 | Selbrede | 361/752 |
| 6,522,515 | B1 * | 2/2003 | Whitney | 361/104 |
| 7,813,820 | B2 * | 10/2010 | Opem et al. | 700/79 |
| 2005/0062579 | A1 * | 3/2005 | Wilson | 337/265 |
| 2006/0015244 | A1 | 1/2006 | Hawkins et al. | |
| 2006/0116803 | A1 | 6/2006 | Armbruster et al. | |
| 2007/0213854 | A1 | 9/2007 | El-Sayed | |

OTHER PUBLICATIONS

Siemens, Automation Systems S7-400H Fault-tolerant Systems Manual, Edition Jan. 2004, Chapter 7.
European Search Report for EP 09176348, Feb. 26, 2010.

* cited by examiner

*Primary Examiner* — Jared Fureman
*Assistant Examiner* — Lucy Thomas
(74) *Attorney, Agent, or Firm* — Boyle Fredrickson, S.C.; R. Scott Speroff; John M. Miller

(57) ABSTRACT

An input termination board for use with an industrial controller in a safety system is disclosed herein. The industrial controller may be populated with standard analog input modules according to the requirements of the application. The termination board may selectively receive a single analog input signal from a remote device and transmit the signal to corresponding channels on two analog input modules or, alternately, receive two analog input signals and transmit each signal to one of the two corresponding channels. In addition, a program executing on the controller of the safety module monitors and tests each of the analog input channels on the input modules, verifying proper operation of the modules. If the program detects a fault in either input module, the safety system may alternately shut down according to a fail-safe procedure or continue operating under a fault-tolerant mode of operation.

20 Claims, 2 Drawing Sheets

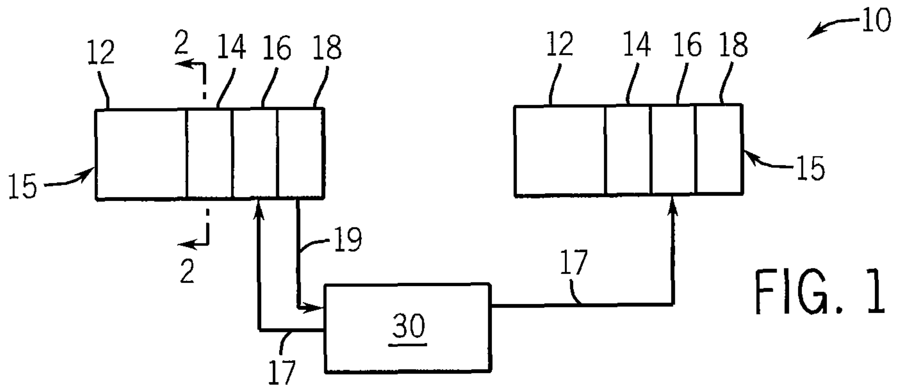
FIG. 1
FIG. 2
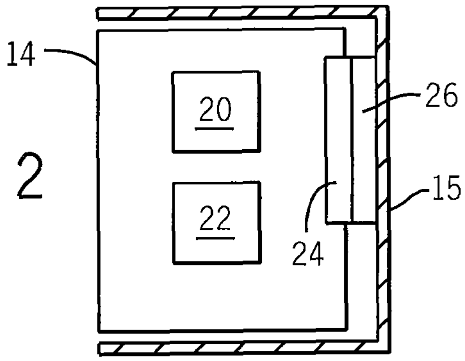
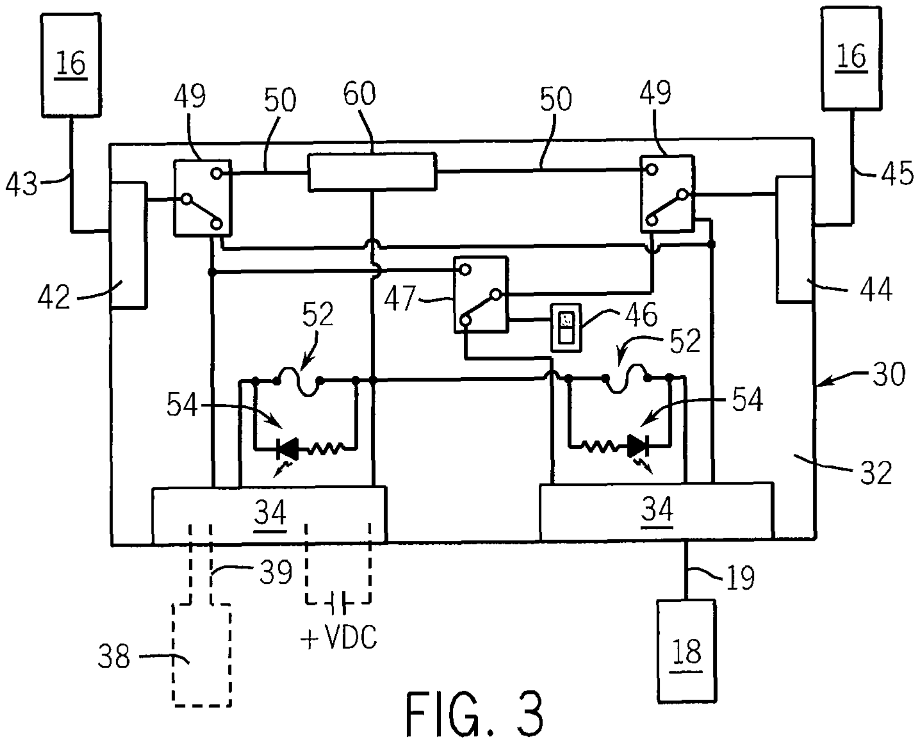
FIG. 3

APPARATUS FOR FAULT TOLERANT ANALOG INPUTS

CROSS-REFERENCE TO RELATED APPLICATIONS

This application claims the benefit of U.S. Provisional Application Nos. 61/115,795, 61/115,801, and 61/115,807. Each of the provisional applications entitled "Termination for Fault Tolerant I/O and AOI's for SIL 2 ControlLogix" was filed on Nov. 18, 2008 and is hereby incorporated by reference in its entirety.

BACKGROUND OF THE INVENTION

The subject matter disclosed herein relates to fault tolerant analog inputs for a safety control system. More specifically, the subject matter relates to a termination board for connecting remote devices that provide analog signals to a controller, such as a programmable logic controller, for a safety system.

A Programmable Logic Controller (PLC) is a special purpose computer typically used for real-time control of an industrial machine or process. The PLC has a modular design such that it may be readily configured for numerous types of machines or processes across a wide variety of industries. The PLC includes a rack, or multiple racks, typically containing an integral power supply and multiple slots to plug in different modules. The rack further incorporates a backplane such that different modules may communicate with each other. A wide variety of modules exist to accommodate the wide variety of applications for a PLC. This modular design provides a cost benefit because standard modules may be developed that are mass produced and configurable according to the machine or process to be controlled.

Some of these standard modules include the processor module as well as input and output modules. The inputs and outputs may be digital, where the presence or absence of a DC voltage level indicates a logical one or zero, or analog, where a continuously variable input voltage represents a range of input data. The input and output modules may further include varying numbers of channels, for example eight, sixteen, or thirty-two, such that the PLC may be easily configured according to the machine or process to be controlled.

Industrial control systems differ from conventional computer systems in that they provide highly reliable operation and deterministic real-time control. In part, this requires that data communicated between the processor and the input and output modules be transmitted in a predictable sequence. Further, a program must execute on the PLC in a predictable sequence to execute the control functions of the PLC. This program is typically developed in "ladder logic," consisting of a series of "rungs." Each rung typically monitors one or more inputs or internal conditions on the input portion of the rung to determine whether to execute the output portion of the rung. The output portion of the rung may set an output channel, start an internal timer, or perform some other function. The program executes as a continuous loop where one loop through the program constitutes a scan of the program.

"Safety controllers" are also special purpose computers used to ensure the safety of humans working in the environment of an industrial process which may be implemented using a PLC. A safety controller may share some hardware, such as remote sensors and actuators, when used for machine control and safety; however, in a process application the safety controller operates independently of the process controller. Typically, a safety controller operates independently of a process controller and is connected to a separate set of sensors and actuators to monitor the process, forming a safety control system. The safety control system monitors operation of the process and may initiate an orderly shutdown of the process if the primary process control system fails. The safety control system is designed to monitor the machine or process and to protect machine operators, technicians, or other individuals required to interact with the machine or process as well as protect the equipment itself. The safety control system monitors the process for a potentially unsafe operating condition which may be caused by an out of control process. If the safety system detects a potentially unsafe operating condition, the safety controller operates to put the machine or process into a safe state.

To this extent, a certification process has been established to provide Safety Integrity Level (SIL) ratings to equipment, identifying different degrees of safety. These ratings are determined by such factors as mean time between failures, probability of failure, diagnostic coverage, safe failure fractions, and other similar criteria. These safety ratings may be achieved, at least in part, by incorporating redundancy into the safety system along with a means of cross-checking the redundant components against each other.

For example, two sensors may be used to monitor one operating condition or a single sensor may be connected to two different inputs in a controller. Still further redundancy may be achieved by providing two separate input modules operating in two separate racks having separate processors and by connecting an input signal to each of the two input modules. However, it is apparent that as redundancy increases, the complexity and number of wiring connections that are required similarly increases. Thus, it would be desirable to provide a control system that satisfies the certification requirements for a safety system while reducing the complexity and number of wiring connections.

In addition, redundant sensors and wiring do not, by themselves, satisfy the certification requirements for a safety system. A sensor may be wired to two different input modules; however, it is possible that an individual input module may experience a failure. Consequently, developers of safety systems must develop custom software to monitor the operation of the input modules. However, developing custom software adds to the cost and complexity of the safety system. Further, custom software is more likely to include errors and to require increased debugging and startup expense than a standardized software routine. Thus, it would be desirable to provide improved reliability of an input module without the added cost or complexity of developing custom software.

BRIEF DESCRIPTION OF THE INVENTION

The present invention provides a termination board for connecting signals from remote devices that provide analog signals to a controller for a safety system. The termination board provides simplified wiring between the input modules and the remote devices. In addition, the operation of the input modules and the input termination board is monitored and tested by the controller to satisfy SIL2 safety requirements.

In one embodiment of the invention, an input termination device for use in a safety system having at least one industrial controller, a first input module, a second input module, and an output module is disclosed. The input termination device includes a circuit board and at least one terminal block mounted on the circuit board. The terminal block has at least one first pair of terminals and at least one second pair of terminals corresponding to one of the first pair of terminals. Each pair of terminals is configured to accept an analog input signal from a remote device. A first input module connector is mounted on the circuit board and configured to transmit the analog input signals from the first pair of terminals to the first input module. A second input module connector is mounted on the circuit board and configured to selectively transmit the analog input signals from either the first pair of terminals or the second pair of terminals to the second input module. The input termination device also has a selection means for connecting either the analog input signals or a fixed reference signal to each of the first and second input module connectors according to a signal from the output module.

Thus, it is a feature of this invention that the input termination device utilizes two standard analog input modules and comparison logic in the controller to create a safety analog input module. The input termination device permits SIL2 rated sensors to be connected at a single termination point and splits the feedback signal to two analog input modules. Alternately, two standard sensors may be used and the signal from each sensor may be wired directly back to one of the two analog input modules. The controller can verify that the values from both signals are in within a specified range of each other to verify proper operation of the input modules.

As another aspect of the invention, the selection means is a plurality of solid state switches, and the fixed reference signal is one of a plurality of DC reference voltages. Each solid state switch selectively connects one of the analog input signals or one of the DC reference voltages to the first or second input module connector. The signal from the output module is controlled by a program executing on the controller to selectively connect either the analog input signals or the DC reference voltages to the first and second input module connectors.

Thus it is another feature of this invention to use fixed voltage references to verify operation of each of the analog input modules. The multiple DC reference voltages can check the full range of operation of the analog to digital converter on the analog input module.

As still another aspect of the invention, the input termination device includes a first cable having preterminated ends removably connected to the first input module connector at a first end and the first input module at a second end and transmitting each of the signals from the first input module connector to the first input module. The input termination device also includes a second cable having preterminated ends removably connected to the second input module connector at a first end and the second input module at a second end and transmitting each of the signals from the second input module connector to the second input module.

Thus, it is another feature of this invention to provide cabling between the circuit board and the input modules as another component in the modular controller. Industrial controllers, including safety controllers, are typically preconfigured, such that the number and location of input modules are known. The input termination device may similarly be preconfigured, such that the length and number of required cables is known and may be provided as another modular component.

In another embodiment of the invention, a safety control system includes a a controller, a first input module in communication with the controller having multiple input channels, a second input module in communication with the controller having multiple input channels, an output module in communication with the controller having at least one output channel, and an input termination device. The input termination device includes a circuit board and at least one terminal block mounted on the circuit board. The terminal block has at least one first pair of terminals and at least one second pair of terminals corresponding to one of the first pair of terminals. Each pair of terminals is configured to accept an analog input signal from a remote device. A first input module connector is mounted on the circuit board and configured to transmit the analog input signals from the first pair of terminals to the first input module. A second input module connector is mounted on the circuit board and configured to selectively transmit the analog input signals from either the first pair of terminals or the second pair of terminals to the second input module. The input termination device also has a selection means for connecting either the analog input signals or a fixed reference signal to each of the first and second input module connectors according to a signal from the output module.

Thus, it is a feature of this invention that the input termination device is incorporated with standard PLC modules to provide a safety control system.

As still another aspect of the invention, the safety control system includes a program executing on the controller to perform a reference test at a configurable time interval. Additionally, the program executing on the controller compares each of the channels on the first input module to the corresponding channel on the second input module. When the difference between the value of the analog input signal on one of the channels on the first input module and the corresponding channel on the second input module exceeds a predetermined deadband for a predetermined time interval the program indicates a fault state.

It is still another aspect of the invention that each input channel converts an analog signal to a digital value comprising a plurality of bits, and the DC reference voltages includes multiple voltage levels selected such that each bit of an input channel will be set at least once if each voltage level is selectively connected to the input channel. The program executing on the processor periodically connects one of the DC reference voltages to each input channel. In addition, the different DC reference voltages may be sequentially connected to an input channel to verify operation of the input channel.

Thus, it is still another feature of the invention that the safety control system ensures that the safety controller can put the machine or process into a safe state. The controller periodically verifies operation of the input modules and continuously monitors the input signals to ensure proper operation of the input modules.

As yet another aspect of the invention, the program executing on the controller of the safety control system performs an ordered shut down of the system if a difference between either of the corresponding channels on the first and second input modules and the DC reference voltage exceeds a predetermined deadband for a predetermined time interval. Alternately, the program may identify the channel on which the difference exceeded the deadband as being in a fault state and resume execution but ignore the input from each channel in a fault state.

Thus, it is another aspect of the present invention that the safety control system may alternately fail in a fail-safe mode or in a fault-tolerant mode.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 1 is a block diagram of one embodiment of the safety control system according to the present invention;

FIG. 2 is a block diagram of a partial cross-sectional view of the controller in FIG. 1;

FIG. 3 is a schematic representation of one embodiment of the safety control system according to the present invention.

Figure 4:
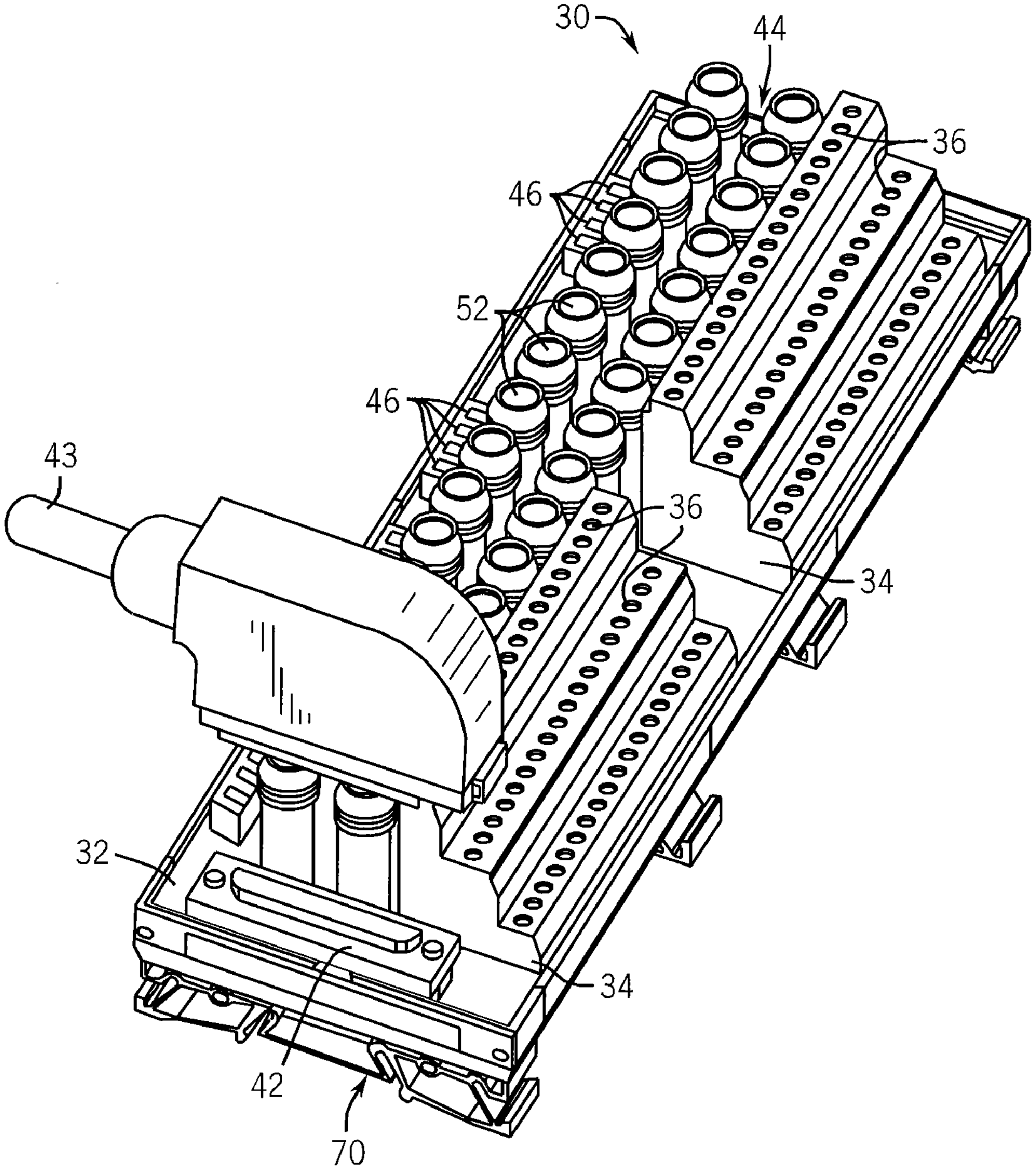
FIG. 4 is an isometric view of one embodiment of the input termination device according to the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Turning initially to FIG. 1, an exemplary embodiment of the safety control system 10 is shown having a dual controller 14 and dual rack 15 configuration. Each rack 15 includes a separate power supply 12, controller 14, input module 16 and output module 18. Each pair of input modules 16 is connected to a termination device 30 by a cable 17. The cable 17 is preferably a multi-conductor cable pre-terminated at each end such that the cable 17 may be plugged into both the termination device 30 and the input module 16. The control system 10 further includes at least one output channel 19 from an output module 18 connected to the termination device 30.

It is contemplated that the safety control system 10 may include many configurations as is known to one skilled in the art. For example, the number of input 16 or output 18 modules used may vary according to the configuration of the control system 10. The input 16 and output 18 modules can be plugged into or removed from the backplane 26 of the rack 15 for easy expandability and adaptability to configuration changes. Further, the control system 10 may employ a single controller 14 with multiple racks 15 or, alternately, a single controller 14 with a single rack 15 according to the requirements of the control system 10 and the safety standards for a specific application.

Turning next to FIG. 2, the controller 14 includes a processor 20 and a memory device 22. The controller 14 includes a connector 24 and can be plugged into or removed from the backplane 26 of the rack 15. A program is stored in the memory device 22 and is executed on the processor 20. The controller 14 is preferably configured to communicate with the input modules 16 and the output module 18 over the backplane 26. Alternately, any means known to one skilled in the art may be used to connect the controller 14 to input 16 and output 18 modules. For example a network, such as ControlNet, DeviceNet, or Ethernet/IP, may be used to connect the controller 14 and the input 16 and output 18 modules.

Referring then to FIGS. 3 and 4, the input termination device 30 includes a circuit board 32 with a first 42 and a second 44 input module connector. It is contemplated that the circuit board 32 is a sheet of material used for mounting and interconnecting components, including, but not limited to, a single board, multiple boards, a printed circuit board, a through-hole board, or any other material known to one skilled in the art on which to mount and interconnect components. Each input module connector 42 and 44 is configured to be connected to one of the input modules 16. Therefore, each input module connector 42 and 44 is preferably configured to transfer one analog input signal 39 for each available channel on the input modules 16. The safety control system 10 may also include a first 43 and a second 45 cable connecting the first 42 and second 44 input module connectors to input modules 16. The first and second cables 43 and 45 are preferably multi-conductor cables with pre-terminated connectors on each end such that the each cable 43 and 45 may plug directly into the input modules 16 and each input module connector 42 and 44. By providing pre-terminated cables 43 and 45 between the input termination device 30 and the input modules 16, the complexity and number of wiring connections in the safety control system 10 is significantly reduced. It is further contemplated that the cables 43 and 45 may carry multiplexed or serial communication signals to reduce the number of conductors within the cable with the addition of appropriate driver hardware to the circuit board 32 and input modules 16.

The input termination device 30 includes at least one terminal block 34 for receiving analog input signals 39 from remote devices 38. Analog input signals 39 are typically two-wire connections and each analog input signal 39 is wired to a pair of terminals 36 on the terminal block 34. The circuit board 32 preferably includes two terminal blocks; however, any configuration of terminal blocks 34 providing sufficient terminals 36 may be used. Each terminal 36 may be a screw-type or screwless terminal block as is known in the art. Each pair of terminals 36 also includes a fusible link 52 with a failure indication means 54, such as a light emitting diode (LED).

The input termination device 30 may be configured to accept either one-sensor or two-sensor wiring. When the input termination device 30 is configured to accept one-sensor wiring, an analog input signal 39 from one remote device 38, preferably a SIL-rated device, is connected to one pair of terminals 36 and sent to both the first 42 and the second 44 input module connector. When the input termination device 30 is configured to accept two-sensor wiring, two separate analog input signals 39, each supplied by a separate remote device 38 monitoring the same process variable, are connected to separate pairs of terminals 36. One of the analog input signals 39 is sent to a channel on the first 42 input module connector and the other analog input signal 39 is sent to the corresponding channel on the second 44 input module connector. Each channel may be independently configured to accept one-sensor or two-sensor wiring. A series of control switches 46, for example dip switches, are provided to configure selection switches 47 to operate with either one or two sensor wiring. In a first position, each control switch 46 selects one-sensor wiring such that the selection switch 47 connects the analog input signal 39 from the first pair of terminals 36 to the second input module connector 44. In a second position, each control switch 46 selects two-sensor wiring such that the selection switch 47 connects the analog input signal 39 from the second pair of terminals 36 to the second input module connector 44. Preferably, a separate control 46 and selection switch 47 are provided for each input channel. Alternately, one control 46 or selection 47 switch may be used to configure multiple or all of the input channels.

One of the terminal blocks 34 includes a connection for a DC voltage input (+VDC). The DC voltage is connected to a reference voltage generator 60. The reference voltage generator 60 provides at least one fixed reference signal 50 that may be selectively sent to one of the input modules 16. The voltage generator may use any method known to one skilled in the art to convert the DC voltage input (+VDC) to fixed reference signals 50, including but not limited to a voltage divider circuit or voltage regulators. In a preferred embodiment, a twenty-four volt DC voltage is connected to the terminal block 34. The voltage reference generator 60 is configured to convert the twenty-four volts to multiple fixed reference signals 50. The levels of each reference signal 50 is selected such that if each reference signal 50 is separately connected to one of the input channels, the set of reference signals 50 will verify that each bit of the analog to digital converter in the input module 16 is operational. For example, the fixed reference signals 50 may be selected to provide a 0V, 2V, 3.3V, and a 5.6V reference signal 50.

A signal 19 from an output module 18 is used to control a series of switches 49 to selectively connect either the reference signal 50 or analog input signal 39 to the input module connectors 42 and 44. In a first position, each switch 49 connects the analog input signal 39 to either the first 42 or second 44 input module connector. In a second position, each switch 49 connects the reference signal 50 to either the first 42 or second 44 input module connector. Preferably, a separate switch 49 is provided for each input channel. Alternately, one switch 49 may be used to configure multiple or all of the input channels.

The safety control system 10 is typically mounted within an enclosure. Therefore, the input termination device 30 preferably includes a connector 70 for mounting the input termination device 30 to a DIN rail. Alternately, the input termination device 30 may have other mounting means, for example holes extending through the circuit board 32 for connecting the input termination device 30 to stand-offs, as is known in the art. The DIN rail connector 70, in coordination with the pre-terminated cables 43 and 45 and the input modules 16, provide a generally modular connection input termination device 30 to the controller 14 in a safety control system 10, reducing the time and expense involved with commissioning the safety control system 10.

In operation, the input termination device 30 along with the program executing on the processor 20 provide safety-rated inputs for the safety control system 10 using standard input 16 and output 18 modules. By either splitting each of the input signals 39 at the termination device 30 and connecting the input signal 39 to both the first 42 and second 44 input module connectors (one-sensor wiring) or by passing each of the two analog inputs 39 to the first 42 and second 44 input module connectors (two-sensor wiring), redundant input signals 39 from the remote devices 38 are sent to the input modules 16. The program executing in the processor 20 uses these redundant input signals for comparing each channel on one input module 16 to the corresponding channel on the second input module 16. In addition, fixed reference signals 50 may periodically be sent to the first 42 and second 44 input module connectors in place of the analog input signals 39 to test operation of each input module 16.

The program continually compares each channel on one input module 16 to the corresponding channel on the second input module 16 in order to verify proper operation of both input modules 16. Either a single input signal 39 from a remote device 38 is split at the input termination device 30 or two remote devices 38, monitoring the same process variable, each send a separate input signal 39 to the input termination device 30. The split signal or the pair of signals is connected to corresponding channels on two separate input modules 16. Consequently, each input module 16 in the pair has an identical set of signals sent to it from the remote devices 38. The program compares the analog input value of each corresponding channel in the two input modules 16 against each other. The program verifies proper operation by checking if the difference between the two analog values remains within a configurable bandwidth. If the difference between the two analog values exceeds the configurable bandwidth for a short time interval, the program indicates that a miscompare has occurred and will initiate a reference test to determine which of the analog input channels is faulted. The time interval is preferably user configurable according to the system requirements, but may initially be set to the time required to perform four scans through the program. If the difference between the two analog values is within the configurable bandwidth, the two analog values are averaged together, and the program executing on the controller 14 uses this averaged value as the analog input value for the channel.

Either upon detection of a miscompare between corresponding input channels or at a periodic time interval the program executes a reference test to verify operation of each channel of an input module 16. The reference test sets a signal 19 on one of the output channels on the output module 18 connected to the input termination device 30. The signal 19 controls a series of switches 49 to selectively connect either the reference signal 50 or analog input signal 39 to the input module connectors 42 and 44. Connecting one of the fixed reference signals 50 to the input channel allows the program to determine whether the input channel is properly converting the analog signals to digital values. The digital value read at the input channel is compared against the known value. If the difference between the digital value and the known value exceeds the configurable bandwidth for a short time interval, the program indicates that the analog input channel is faulted. The program can compare each channel on the input modules 16 against the value of the fixed reference signal known to be connected to that channel and identify any channel that is not properly converting analog input signals to digital values.

The reference test includes a time delay to permit each channel to settle at the fixed reference signal after switching from the analog input signal to the fixed reference signal. The time delay to permit the channel to change state may be about 500 milliseconds but is preferably user configurable according to the system requirements. After the initial time delay the program performs the comparison between the input value and the known value. A second time delay permits the channel to switch back to the analog input signal from the fixed reference signal. The time delay to permit the channel to change state may again be about 500 milliseconds but is preferably user configurable according to the system requirements.

The reference test is periodically executed by the program according to a user defined time interval, for example once per day. Because the program executes in conjunction with the input termination device 30 to supply fixed reference signals 50 to each channel of the input modules 16, the operation of each input module 16 may be performed with no modification of the input modules 16. Prior to initiating the reference test, the program reads the input value on each channel of the input modules 16 and stores this value, for example, in memory or in a buffer. This stored value is used by other routines executing in the safety control system 10 during the reference test. Using the stored value will prevent the other routines from detecting or responding to the fixed reference value when it is connected to the analog input modules 16. Consequently, the safety control system 10 operates with standard input modules 16 and improves the reliability of the input modules 16 without requiring the end user to develop custom software.

If the program identifies a failed input channel, either as a result of a miscompare between two input modules 16 or a by detecting a failure during the reference test, the program may either execute a controlled shut down or continue operating in a fault-tolerant mode. A controlled shut-down of the safety system is a fail-safe operating condition which allows the machine or process being monitored by the safety control system 10 to enter a safe state, preferably in a controlled manner that reduces stress and prevents damage of the machine or process. A safe state is determined according to the machine or process to be controlled and may be, but is not limited to, stopping a spinning motor, preventing an actuator from operating a press, moving a robotic assembly to a predetermined location. Alternately, the machine or process may enter a fault-tolerant operating mode and continue to operate until a later point in time at which it is convenient to repair the faulted input module 16. During fault-tolerant operation, the reference test may be executed more frequently to verify that the remaining input module 16 remains fully functional. Further, whether the controller enters the fail-safe or the fault-tolerant mode of operation upon detection of a fault state is preferably user configurable according to the requirements of the machine or process being monitored by the safety control system 10 or according to safety requirements.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An input termination device for use in a safety system, the safety system having at least one industrial controller, a first input module, a second input module, and an output module, the input termination device comprising:
- a circuit board;
- at least one terminal block mounted on the circuit board having at least one first pair of terminals and at least one second pair of terminals, each pair of terminals configured to accept an analog input signal from a remote device;
- a first input module connector mounted on the circuit board configured to transmit the analog input signals from the first pair of terminals to the first input module;
- a second input module connector mounted on the circuit board configured to selectively transmit the analog input signals from either the first pair of terminals or the second pair of terminals to the second input module; and
- a selection means for connecting either the analog input signals or a fixed reference signal to each of the first and second input module connectors according to a signal from the output module.

2. The input termination device of claim 1 wherein:
- the selection means is a plurality of solid state switches;
- the fixed reference signal is one of a plurality of DC reference voltages; and
- each solid state switch selectively connects one of the analog input signals or one of the DC reference voltages to the first or second input module connector.

3. The input termination device of claim 2 wherein a program executing on the controller controls the signal from the output module to selectively connect either the analog input signals or the DC reference voltages to the first and second input module connectors.

4. The input termination device of claim 1 further comprising:
- a first cable having preterminated ends removably connected to the first input module connector at a first end and the first input module at a second end and transmitting each of the signals from the first input module connector to the first input module; and
- a second cable having preterminated ends removably connected to the second input module connector at a first end and the second input module at a second end and transmitting each of the signals from the second input module connector to the second input module.

5. The input termination device of claim 1 further comprising a fusible link connected in series with each analog input signal.

6. The input termination device of claim 1 further comprising a DIN rail connector attached to the circuit board.

7. A safety control system comprising:
- a controller;
- a first input module in communication with the controller having a plurality of input channels;
- a second input module in communication with the controller having a plurality of input channels;
- an output module in communication with the controller having at least one output channel; and
- an input termination device comprising:
  - a circuit board;
  - at least one terminal block mounted on the circuit board having at least one first pair of terminals and at least one second pair of terminals, each pair of terminals configured to accept an analog input signal from a remote device;
  - a first input module connector mounted on the circuit board configured to transmit the analog input signals from the first pair of terminals to the first input module;
  - a second input module connector mounted on the circuit board configured to selectively transmit the analog input signals from either the first pair of terminals or the second pair of terminals to the second input module; and
  - a selection means for connecting either the analog input signals or a fixed reference signal to each of the first and second input module connectors according to a signal from the output module.

8. The safety control system of claim 7 further comprising:
- a first cable having preterminated ends removably connected to the first input module connector at a first end and the first input module at a second end and transmitting each of the signals from the first input module connector to the first input module; and a second cable having preterminated ends removably connected to the second input module connector at a first end and the second input module at a second end and transmitting each of the signals from the second input module connector to the second input module.

9. The safety control system of claim 7 further comprising a fusible link connected in series with each analog input signal.

10. The safety control system of claim 7 further comprising a DIN rail connector attached to the circuit board.

11. The safety control system of claim 7 wherein:

the selection means is a plurality of solid state switches;

the fixed reference signal is one of a plurality of DC reference voltages; and each solid state switch selectively connects one of the analog input signals or one of the DC reference voltages to the first or second input module connector.

12. The safety control system of claim 11 wherein a program executing on the controller controls the signal from the output module to selectively connect either the analog input signals or the DC reference voltages to the first and second input module connectors.

13. The safety control system of claim 12 wherein the program executing on the controller performs a reference test comprising the steps of:

controlling at least one solid state switch to connect one of the DC reference voltages to corresponding channels of the first and second input modules;

comparing the selected channel of the first input module to the DC reference voltage; and comparing the corresponding channel of the second input module to the DC reference voltage.

14. The safety control system of claim 13 wherein the program performs the reference test at a configurable time interval.

15. The safety control system of claim 7 wherein the program further executes to compare each of the channels on the first input module to the corresponding channel on the second input module.

16. The safety control system of claim 15 wherein the program indicates a fault state when the difference between the value of the analog input signal on one of the channels on the first input module and the corresponding channel on the second input module exceeds a predetermined deadband for a predetermined time interval.

17. The safety control system of claim 13 wherein the program performs an ordered shut down of the system if a difference between either of the corresponding channels on the first and second input modules and the DC reference voltage exceeds a predetermined deadband for a predetermined time interval.

18. The safety control system of claim 13 wherein:

a difference between one of the corresponding channels on the first and second input modules and the DC reference voltage exceeds a predetermined deadband for a predetermined time interval;

the program identifies the channel on which the difference exceeds the deadband as being in a fault state; and the program resumes execution but ignores the input from the channel in the fault state.

19. The safety control system of claim 11 wherein each input channel converts an analog signal to a digital value comprising a plurality of bits, and the plurality of DC reference voltages comprises voltage levels selected to cause each bit to be set at least once if each voltage level is selectively connected to the input channel.

20. The safety control system of claim 19 wherein a program executing on the processor periodically connects one of the DC reference voltages to each input channel and sequentially connects each of the DC reference voltages to verify operation of the input channel.

* * * * *